US007039741B2

(12) United States Patent
Bakke et al.

(10) Patent No.: US 7,039,741 B2
(45) Date of Patent: May 2, 2006

(54) METHOD AND APPARATUS FOR IMPLEMENTING RESILIENT CONNECTIVITY IN A SERIAL ATTACHED SCSI (SAS) DOMAIN

(75) Inventors: Brian Eric Bakke, Rochester, MN (US); Timothy Jerry Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 10/670,710

(22) Filed: Sep. 25, 2003

(65) Prior Publication Data
US 2005/0071532 A1    Mar. 31, 2005

(51) Int. Cl.
*G06F 13/00*    (2006.01)
(52) U.S. Cl. ...................... 710/300; 455/450
(58) Field of Classification Search ............... 710/300; 455/450
See application file for complete search history.

(56) References Cited

U.S. PATENT DOCUMENTS

| 5,630,169 | A * | 5/1997 | Jackson ................... 710/5 |
| 6,078,979 | A * | 6/2000 | Li et al. ................. 710/312 |
| 6,598,106 | B1 * | 7/2003 | Grieshaber et al. ........ 710/305 |
| 6,898,730 | B1 * | 5/2005 | Hanan ....................... 714/7 |
| 6,901,531 | B1 * | 5/2005 | Gilbert et al. .............. 714/5 |
| 2003/0041201 | A1 * | 2/2003 | Rauscher .................. 710/300 |
| 2004/0193791 | A1 * | 9/2004 | Felton et al. .............. 711/112 |
| 2005/0066100 | A1 * | 3/2005 | Elliott et al. ............. 710/300 |

OTHER PUBLICATIONS

Serial Attached SCSI Architecture, Sep. 30, 2003, Rob Elliott, Hp.*

* cited by examiner

*Primary Examiner*—Tim Vo
*Assistant Examiner*—Christopher Daley
(74) *Attorney, Agent, or Firm*—Joan Pennington

(57) ABSTRACT

A method and apparatus are provided for implementing resilient connectivity in a Serial Attached SCSI (SAS) domain. A first edge expander is connected to a first port of a plurality of SAS devices for enabling communications between each of the plurality of SAS devices through the first edge expander. A second edge expander is connected to a second port of the plurality of SAS devices for enabling communications between each of the plurality of SAS devices through the second edge expander. A subtractive routing port of each of the first edge expander and the second edge expander is connected together for enabling communications between each of the plurality of SAS devices via the first ports and the second ports of the plurality of SAS devices.

12 Claims, 4 Drawing Sheets

PRIOR ART

PRIOR ART

METHOD AND APPARATUS FOR IMPLEMENTING RESILIENT CONNECTIVITY IN A SERIAL ATTACHED SCSI (SAS) DOMAIN

FIELD OF THE INVENTION

The present invention relates generally to the data processing field, and more particularly, relates to a method and apparatus for implementing resilient connectivity in a Serial Attached SCSI (SAS) domain.

DESCRIPTION OF THE RELATED ART

The problem to be solved is to maintain availability of access between storage nodes, with a node being either an initiator device, for example, to connect to a host system, or target device, such as, a disk or tape drive. Loss of access is a problem because it causes loss of access to the data contained on the media, and is also a problem in configurations with multiple initiator adapters because an initiator adapter may not be able to detect the presence of another initiator adapter and may make erroneous decisions as a result.

The best existing solutions are generally tolerant of a single failure, however access is lost if more than one failure is encountered. FIGS. 1, 2, and 3 illustrate the drawbacks of the current technologies that allow for redundant paths.

FIG. 1 illustrates a solution based upon Fiber Channel Arbitrated Loop (FC-AL) devices. The FC-AL devices are connected in loop topologies, and are dual-ported for reliability reasons utilizing two FC-AL loops 0, 1. A port bypass circuit (PBC) is used to maintain loop connectivity in the presence of missing or failed nodes on the loop. A failure in any single component is tolerated with access being maintained. However, the existence of multiple failures such as an initiator port failure on one loop and a target port failure on the other loop, for example, failures of initiator 1 Port 0 and Device 1 Port 1, will cause the initiator and target devices to be unable to communicate.

Serial Attached SCSI (SAS) is an emerging industry standard that is targeted to replace parallel SCSI devices as the enterprise-class standard storage interface. An interconnection of Serial Attached SCSI (SAS) nodes is known as a SAS domain. The SAS devices are interconnected with a set of point-to-point links in the SAS domain. SAS devices also have two connections for performance and reliability reasons.

FIG. 2 illustrates a configuration based upon Serial Attached SCSI (SAS) devices. The illustrated configuration contains one SAS domain with the two ports of each SAS device attached to a single edge expander, as might be used in a low cost system. The edge expander is a device that allows fanout and connections between multiple devices. In this configuration a failure of a single component, such as an edge expander, causes access to be lost to the media device.

As shown in FIG. 2, in an interconnection of Serial Attached SCSI (SAS) nodes or SAS domain, each logical connection to a node is made via a port. A port is composed of point-to-point links, which are denoted as phys. For performance and reliability reasons multiply phys may be ganged together to make up a port, this allows for multiple concurrent connections to be established. A typical media device, such as a disk drive, is expected to contain two ports with each port composed typically of a single phy.

To enable larger configurations, edge expanders are used. The edge expander enables communication to be established between nodes that are directly connected to the edge expander. The edge expander is a simple device with significantly less function than a switch would have, for example, the edge expander has no routing tables, and the edge expander is available at a significantly lower cost as a result. For example, the projected cost estimates for an edge expander are less than 10% of a fiber channel switch cost per port.

To enable larger configurations than would be allowed by direct connections to the edge expander, that is to construct SAS domains with a greater number of nodes, each edge expander contains a subtractive routing port as shown in FIG. 2. If a SAS node makes a connection request to the edge expander requesting a node that is not directly connected to the edge expander, the request is then forwarded out this subtractive routing port. The respective subtractive routing ports of the edge expanders are connected to a fanout expander. The fanout expander does contain a routing table, and is able to determine the correct edge expander to route the request, that is, the edge expander to which the requested node is directly connected.

FIG. 3 illustrates a more advanced SAS configuration utilizing an interconnect strategy similar to that used for FC-AL systems. There is now no longer a single point of failure since an edge expander failure now only impacts one of the two connections to each SAS device. However, as was seen in the FC-AL case, a pair of failures such as an initiator port failure coupled with a target port failure causes a loss of all communication between the initiator and target, for example failures of initiator 1 Port 0 and Device 1 Port 1.

A need exists for a mechanism for implementing resilient connectivity in a Serial Attached SCSI (SAS) domain.

SUMMARY OF THE INVENTION

A principal object of the present invention is to provide a method and apparatus for implementing resilient connectivity in a Serial Attached SCSI (SAS) domain. Other important objects of the present invention are to provide such method and apparatus for implementing resilient connectivity in a Serial Attached SCSI (SAS) domain substantially without negative effect and that overcome many of the disadvantages of prior art arrangements.

In brief, a method and apparatus are provided for implementing resilient connectivity in a Serial Attached SCSI (SAS) domain. A first edge expander is connected to a first port of a plurality of SAS devices for enabling communications between each of the plurality of SAS devices through the first edge expander. A second edge expander is connected to a second port of the plurality of SAS devices for enabling communications between each of the plurality of SAS devices through the second edge expander. A subtractive routing port of each of the first edge expander and the second edge expander is connected together for enabling communications between each of the plurality of SAS devices via the first ports and the second ports of the plurality of SAS devices.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 4:
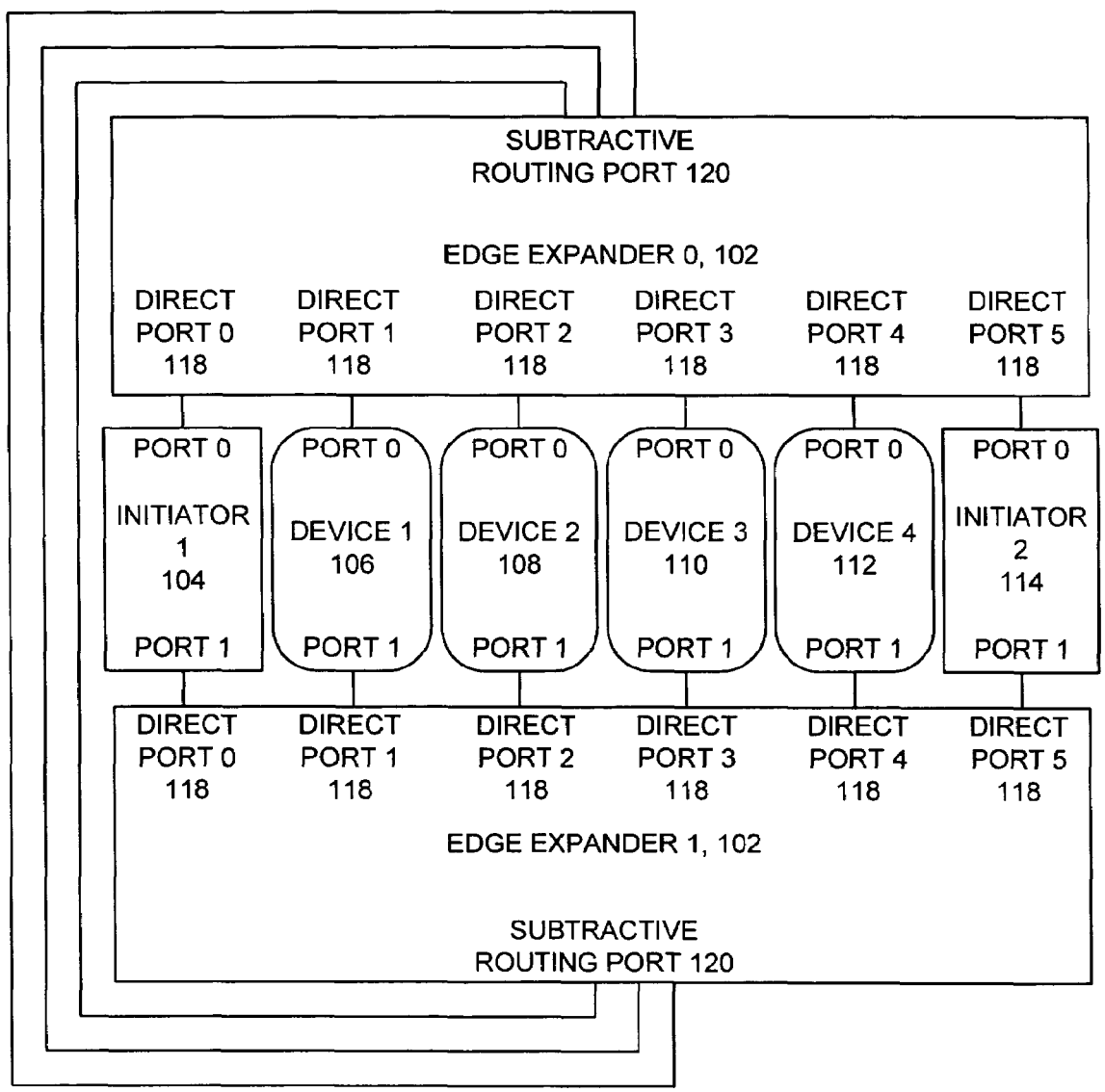
FIG. 4 is a block diagram illustrating a Serial Attached SCSI (SAS) configuration or system including a resilient SAS domain in accordance with the preferred embodiment.

Referring now to the drawings, in FIG. 4 there is shown a Serial Attached SCSI (SAS) network generally designated by the reference character 100 including a resilient SAS domain in accordance with the preferred embodiment. In the SAS network 100, all connections are made via point-to-point links. SAS network 100 includes a pair of edge expanders 0, 1, 102 used to interconnect a plurality of SAS initiators 1–2, and devices 1–4, 104, 106, 108, 110, 112, and 114.

Each of the edge expanders 0, 1, 102 contains multiple ports including a plurality of direct routing ports, 0–5, 118 and a subtractive routing port 120. Each node of the SAS domain including respective ports 0 and 1 of initiator 1, 104, devices 1–4, 106, 108, 110, 112, and initiator 2, 114 is connected to a respective edge expander direct routing port 118 of the respective edge expanders 0, 1, 102. The respective direct routing ports 0–5, 118 of the edge expanders 0, 1, 102 are respectively connected via point-to-point links to respective port 0, port 1 of SAS initiator 1, 104, SAS device 1, 106, SAS device 2, 108, SAS device 3, 110, SAS device 4, 112, and SAS initiator 2, 114. Communications between the ports 0 of initiator 1, 104, devices 1–4, 106, 108, 110, 112, and initiator 2, 114 are provided through the edge expander 0, 102. Communications between the ports 1 of initiator 1, 104, devices 1–4, 106, 108, 110, 112, and initiator 2, 114 are provided through the edge expander 1, 102.

In accordance with features of the preferred embodiment, a novel method of interconnecting the components of a SAS domain is provided that significantly improves the fault resiliency of the system, and that is provided without incurring any additional product cost over a standard SAS configuration. The improved fault resiliency is achieved by a novel usage of a subtractive routing port 120 of edge expanders 0, 1, 102 in the SAS network 100 of the preferred embodiment.

As shown in FIG. 4, the subtractive routing ports 120 of edge expanders 0, 1, 102 are connected together in the SAS network 100 of the preferred embodiment. The subtractive routing port 120 of each edge expanders 0, 1, 102 in SAS network 100 allows frames to be sent between nodes not directly attached to the same edge expander. The subtractive routing ports 120 connecting the two edge expanders 0, 1, 102 advantageously are composed of multiple phys for enabling multiple concurrent connections to be established.

Figure 2:
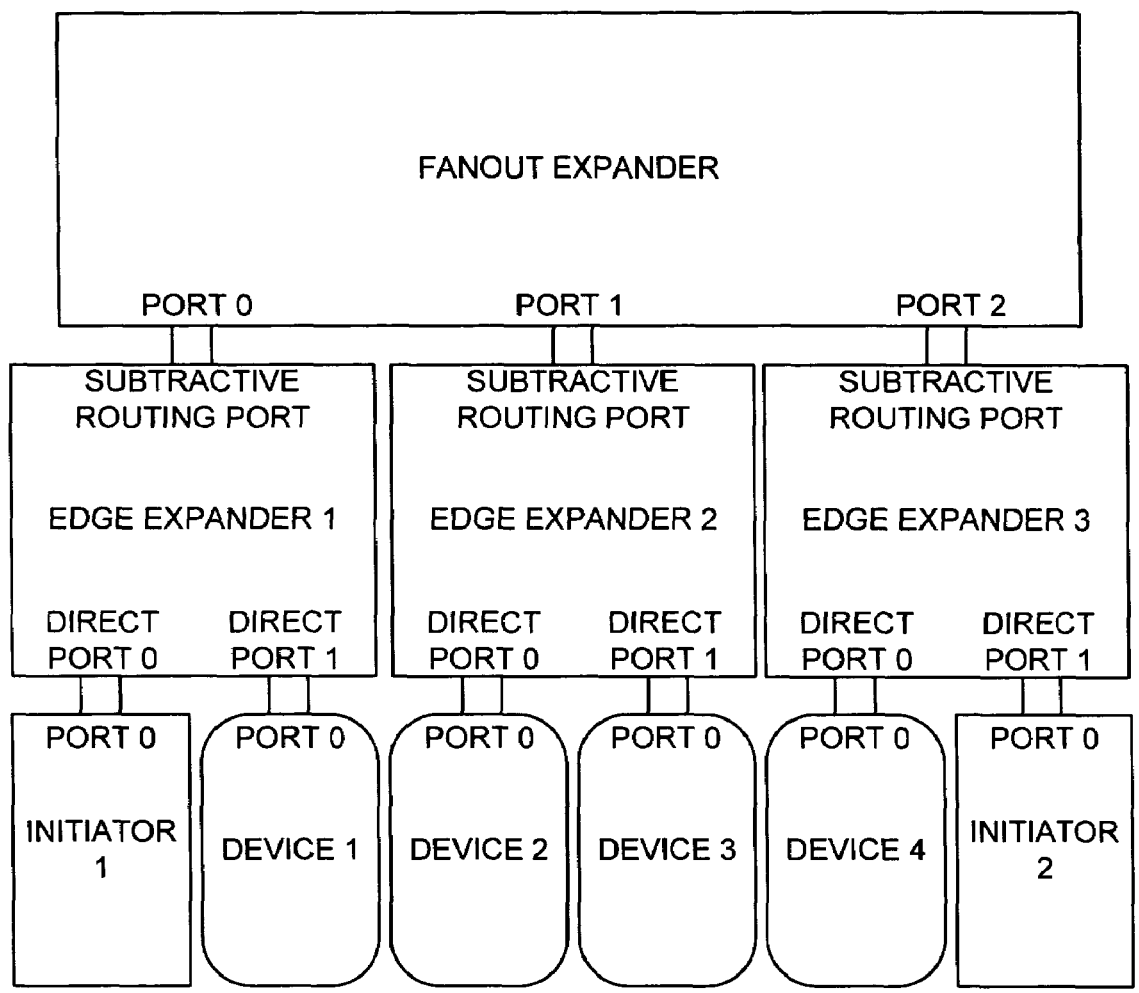

In SAS network 100 of the preferred embodiment, each of the edge expanders 0, 1, 102 is implemented with a conventional device or edge expander typically used to interconnect SAS devices to enable larger topologies, and having behavior as described in the "Serial Attached SCSI Specification" by American National Standards Institute (ANSI). The capabilities provided by the components of the standard SAS configurations of FIGS. 2 and 3 are the same capabilities utilized to implement the SAS network 100 providing resilient connectivity of the preferred embodiment.

When a frame is received by the edge expanders 0, 1, 102 at a particular direct routing port, such as direct routing port 0, 118, the edge expander compares the destination SAS address contained within the frame to the SAS address of each of the nodes of the other direct routing ports 1–5, 118 or SAS address of SAS devices 106, 108, 110, 112, and 114. If a match is found, then the frame is routed to that node. If no match is found, then the frame is instead sent to the subtractive routing port 120. When the subtractive routing port 120 receives a frame, substantially the same edge expander behavior occurs. The expander 102 compares the destination SAS address contained within the frame to the SAS address of each of the nodes of the direct routing ports 0–5, 118 or SAS address of SAS devices 104, 106, 108, 110, 112, and 114. An exception is that if a match is not found, then the frame is rejected instead of being resent on the subtractive routing port 120.

Figure 3:
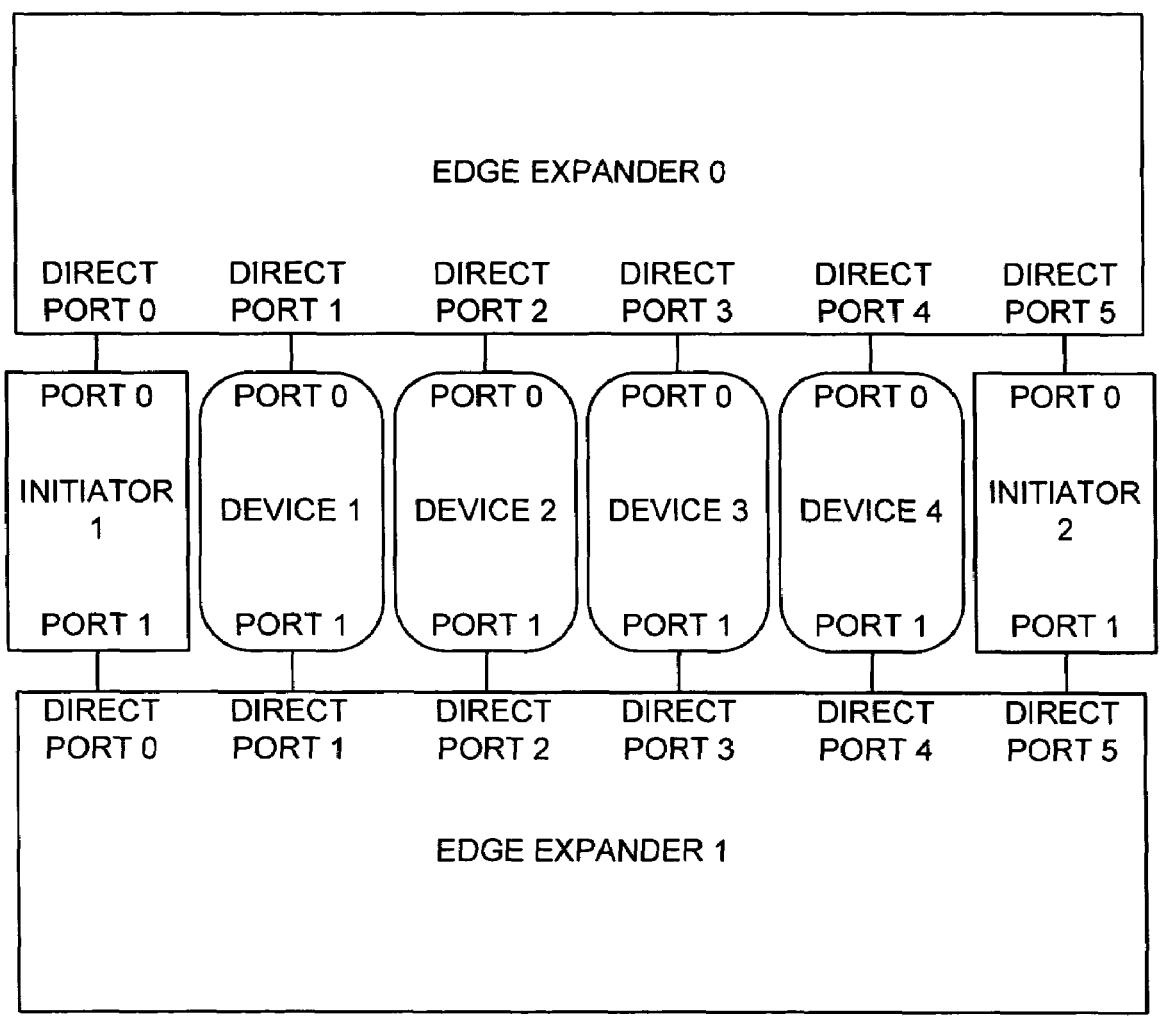

SAS network 100 of the preferred embodiment improves upon the reliability provided by the standard redundant SAS configuration shown in FIG. 3. FIG. 3 is tolerant of the failure of any single component or link in the SAS domain, however, the concurrent failure of multiple components can cause loss of access between nodes in the domain. SAS network 100 prevents this loss of access by interconnecting the components 104, 106, 108, 110, 112, and 114 in a novel fashion with the subtractive routing ports 120 of edge expanders 0, 1, 102 and thereby introducing additional paths that may be used.

In the conventional redundant SAS configuration of FIG. 3, there are two paths between each pair of nodes and each path utilizes one of the two ports of the beginning node and connects to a specific port of the end node.

In SAS network 100 there are four paths between each pair of nodes because each port of the beginning node may be connected to either port of the end node. The additional connections are made possible because the edge expanders 0, 1, 102 are connected together through their respective subtractive routing ports 120, and enable the formation of the single larger SAS domain of SAS network 100 instead of two smaller SAS domains as in the conventional SAS configuration of FIG. 3.

Figure 1:
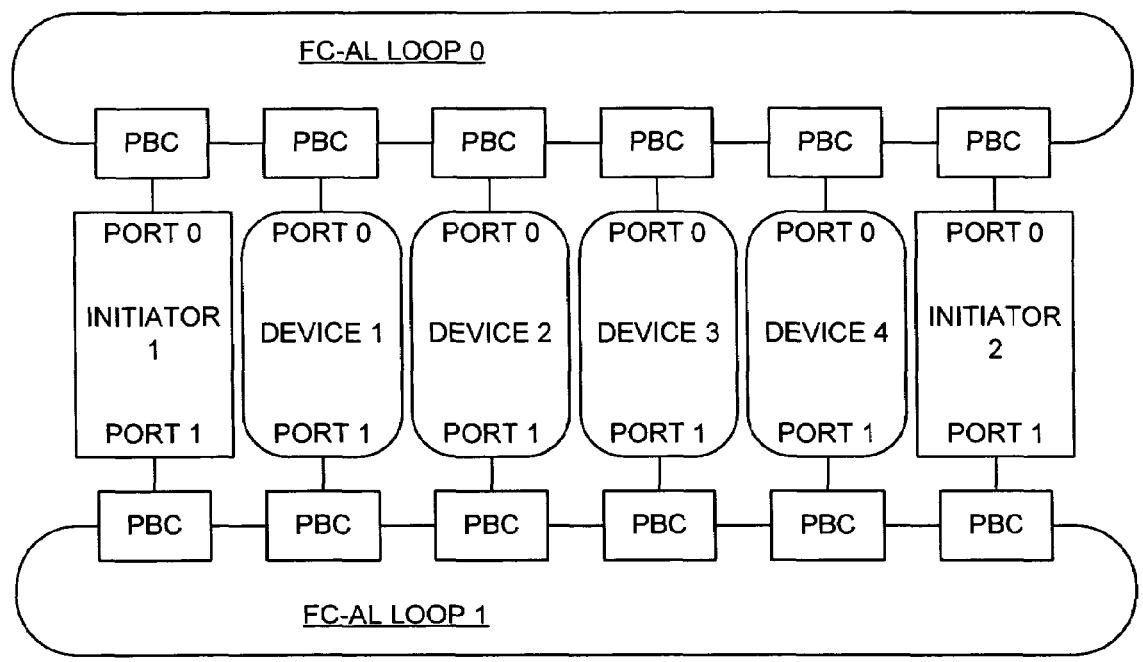
FIGS. 1, 2, and 3 illustrate prior art technologies that allow for redundant paths.

The type of configuration of SAS network 100 was not possible in earlier technologies, such as the FC-AL configuration illustrated in FIG. 1, because the earlier technologies were loop-based. Connecting the two loops together in a configuration such as that depicted in FIG. 1 would introduce a single point of failure, and in fact the possibility of a single point of failure was what led to providing SAS devices that contain two ports.

The prior art SAS configuration shown in FIG. 2 is also composed of a single SAS domain, however this configuration contains single points of failure, for example, in the edge expanders and the fanout expander and does not provide the desired level of reliability and fault tolerance. SAS network 100 achieves the high level of reliability and fault tolerance while eliminating the need for a fanout expander of the prior art SAS configuration of FIG. 2.

All components necessary to implement the SAS network 100 of the preferred embodiment are low-cost industry standard components, with no custom hardware components required. As can be seen by comparing the prior art SAS configuration of FIG. 3 and the SAS network 100 of the preferred embodiment, the same number of components of the same type is required. The only change required to implement the SAS network 100 of the preferred embodiment is to vary how these components are interconnected, and to enable the software support to utilize the additional alternate paths from an initiator to a target. This enables the construction of SAS network 100 of the preferred embodiment for the same cost as a system not utilizing our invention.

The presence of the additional paths between nodes, created by using the subtractive routing ports 120, also yields better performance characteristics for SAS network 100. Overall system performance is maintained in the presence of failure, or any single-ported devices 104, 106, 108, 110, 112, 114, while prior art arrangements experienced performance degradation as components failed. This can be understood, for example, by comparing the prior art SAS configuration of FIG. 3 and SAS network 100.

First assume that a number of devices are either single-port devices, such as device 3, 110, and device 4, 112, having only a functional port 0 connected to the edge expander 0, 102, as would be the case if Serial ATA devices are attached to the SAS domain using Serial ATA Tunneling Protocol (STP), or are dual-ported devices with a failed port. In the prior art SAS configuration of FIG. 3 each device is accessible only via a single initiator port through the edge expander to the functional port of the target device. Depending on the characteristics of the workload, this port may become over utilized while the other initiator port is under utilized.

SAS network 100 allows the otherwise under utilized port of the initiator to reach the target device. SAS network 100 does this by reaching the functional port of the target device via the under utilized port, to the edge expander 0 or 1, 102 not connected to the functioning port of the device, through the subtractive routing port 120 to the other edge expander, and then reaching the functioning port of the device. Had this path not been available, then the initiator would have incurred additional latency and reduced system performance while waiting to use the port connected to the edge expander that was directly connected to the media device.

As illustrated in FIG. 4, the subtractive routing port 120 connecting the two edge expanders 0, 1, 102 can be composed of multiple phys to enable multiple concurrent connections to be established of this type. This multiple phy subtractive routing port 120 is allowed by the SAS architecture and also desirable in a standard configuration such as shown in FIG. 2 to enable multiple concurrent connections through the fanout expander. This enables SAS network 100 again to obtain maximum benefit while again utilizing standard components.

In a clustered highly-available configuration, multiple initiator adapters are talking to the storage devices. For the case of a high-function initiator adapter, it may store configuration and state information on reserved areas of the media that are not exposed to the system. This might include, for instance, information on the current state of the RAID array. In a system that is functioning normally one adapter would have primary responsibility for managing the state of these devices and controlling the contents of the configuration and state metadata stored on the device.

In a standard configuration, such as shown in the prior art SAS configuration of FIG. 3, there are failure modes where the adapters cannot detect the presence of the other adapter, yet both adapters still have access to all of the storage devices. An example of such a failure mode is to have failures occur in both initiator 1 port 0 and initiator 2 Port 1. In this case, the adapters may make erroneous decisions and possibly irrevocably corrupt the state of the storage devices. For example both adapters might be concurrently updating the metadata in the devices with conflicting information. Previous solutions, such as those implemented using FC-AL technology as shown in FIG. 1, have incorporated additional hardware into the system such that the adapters have additional methods with which to determine the configuration.

Using SAS network 100 this failure mode has been essentially eliminated. That is, the failure mode where the two adapters can each access the same device, but cannot detect each other is eliminated in SAS network 100 through the usage of the additional paths through the subtractive routing ports 120 of the edge expanders 0, 1, 102. Increasing the width of the subtractive routing ports 120 of the edge expanders 0, 1, 102 by incorporating additional phys such that a single driver or receiver failure does not cause communication loss, further reduces the likelihood of failure. As described above, these additional phys are also desirable for enabling multiple concurrent connections to be established and are provided in the preferred embodiment of the edge expanders 0, 1, 102 of SAS network 100. SAS network 100 has lower system cost and reduced complexity as compared to prior art arrangements, and additionally does not require the additional development or inclusion of custom hardware to provide the enhanced level of function.

SAS network 100 also allows enhanced reliability for legacy devices that are attached using another storage protocol, the Serial ATA protocol. Serial ATA devices may be attached directly to a SAS domain because SAS is backwards compatible with Serial ATA as is described in the "Serial Attached SCSI Specification" by ANSI, and the Serial ATA devices are then communicated with via the Serial ATA Tunneled Protocol (STP). However, all Serial ATA devices are single-ported and might be attached as shown in FIG. 2, or to one of the edge expanders shown in FIG. 3. If the initiator port connected to that edge expander fails, then all access is lost to the device. However, if a Serial ATA device is attached to SAS network 100, then there are two paths to the Serial ATA device since either initiator port may be used to access the Serial ATA device. Either initiator port may fail without losing access to the device. This enables reliability and fault tolerance to be enhanced for a storage device utilizing a technology, such as Serial ATA, that is architected as a direct link without any fault tolerant provisions.

In brief summary, in accordance with advantages of the preferred embodiment, system fault tolerance is increased. Access is possible from any node to any other node in the presence of multiple failures in the SAS network 100 of the preferred embodiment. This is a significant improvement over prior FC-AL designs, and can be used as a building block in the construction of fault-tolerant autonomic systems. System cost for the fault-tolerant SAS network 100 of the preferred embodiment is substantially the same as that for a standard configuration. SAS configuration 100 utilizes components that are industry standard, low-cost, and readily available. System bandwidth and latency performance is preserved even in the presence of a port failure on a node because the availability of additional paths allow congestion or link saturation to be bypassed, that is, congestion or link saturation is prevented. SAS network 100 of the preferred embodiment also creates multiple paths to a single-ported device, which also enables higher performance by allowing more efficient use of the available bandwidth via bypassing an over utilized link. SAS configuration 100 is readily applicable to the creation of cluster highly available (HA) solutions. Prior art arrangements has possible failure modes where two initiator adapters could not see each other but, both still had maintained access to the media devices. In this case the adapters could make incorrect, and potentially catastrophic, decisions on what were the correct actions. To limit this problem, some prior art systems introduced additional hardware components, resulting in increase system cost and complexity, to detect these failure modes. SAS configuration 100 has eliminated those failure modes so that the additional hardware is not required, and correct determinations are made on the system configuration.

While the present invention has been described with reference to the details of the embodiments of the invention shown in the drawing, these details are not intended to limit the scope of the invention as claimed in the appended claims.

What is claimed is:

1. A method for implementing resilient connectivity in a Serial Attached SCSI (SAS) domain comprising the steps of:
   connecting a first edge expander to a first port of a plurality of SAS devices for enabling communications between each of said plurality of SAS devices through said first edge expander;
   connecting a second edge expander to a second port of said plurality of SAS devices for enabling communications between each of said plurality of SAS devices through said second edge expander; and
   connecting together a subtractive routing port of each of said first edge expander and said second edge expander for enabling communications between each of said plurality of SAS devices via said first ports and said second ports of said plurality of SAS devices.

2. A method for implementing resilient connectivity in a Serial Attached SCSI (SAS) domain as recited in claim 1 wherein the step of connecting said first edge expander includes the step of connecting respective direct routing ports of said first edge expander to said first port of said plurality of SAS devices; and wherein the step of connecting said second edge expander includes the step of connecting respective direct routing ports of said second edge expander to said second ports of said plurality of SAS devices.

3. A method for implementing resilient connectivity in a Serial Attached SCSI (SAS) domain as recited in claim 1 includes the step of ganging together multiple point-to-point links to form said subtractive routing ports of said first edge expander and said second edge expander for enabling multiple concurrent connections with said subtractive routing ports.

4. A method for implementing resilient connectivity in a Serial Attached SCSI (SAS) domain as recited in claim 1 includes the step of utilizing said subtractive routing ports of said first edge expander and said second edge expander for communicating from said first ports of said plurality of SAS devices to said second ports of said plurality of SAS devices.

5. A method for implementing resilient connectivity in a Serial Attached SCSI (SAS) domain as recited in claim 1 includes the step of utilizing said subtractive routing ports of said first edge expander and said second edge expander for communicating from said second ports of said plurality of SAS devices to said first ports of said plurality of SAS devices.

6. A method for implementing resilient connectivity in a Serial Attached SCSI (SAS) domain as recited in claim 1 includes the step of selectively utilizing said subtractive routing ports of said first edge expander and said second edge expander for workload balancing of communications between said plurality of SAS devices with a failure of one or more of said first and second ports of said plurality of SAS devices.

7. Apparatus for implementing resilient connectivity in a Serial Attached SCSI (SAS) domain comprising:
   a plurality of SAS devices, each having a first port and a second port;
   a first edge expander and a second edge expander, each edge expander having a plurality of direct routing ports and a subtractive routing port;
   each of said plurality of direct routing ports of said first edge expander respectively connected to said first port of a respective one of said plurality of SAS devices for enabling communications between each of said plurality of SAS devices;
   each of said plurality of direct routing ports of the second edge expander respectively connected to said second port of a respective one of said plurality of SAS devices for enabling communications between each of said plurality of SAS devices; and
   said subtractive routing ports of said first edge expander and said second edge expander connected together for enabling communications between each of said plurality of SAS devices via said first ports and said second ports of said plurality of SAS devices.

8. Apparatus for implementing resilient connectivity in a Serial Attached SCSI (SAS) domain as recited in claim 7 wherein said subtractive routing ports of said first edge expander and said second edge expander include multiple point-to-point links enabling multiple concurrent connections.

9. Apparatus for implementing resilient connectivity in a Serial Attached SCSI (SAS) domain as recited in claim 7 wherein said subtractive routing ports of said first edge expander and said second edge expander are used for communicating from said first ports of said plurality of SAS devices to said second ports of said plurality of SAS devices.

10. Apparatus for implementing resilient connectivity in a Serial Attached SCSI (SAS) domain as recited in claim 7 wherein said subtractive routing ports of said first edge expander and said second edge expander are used for communicating from said second ports of said plurality of SAS devices to said first ports of said plurality of SAS devices.

11. A Serial Attached SCSI (SAS) network for implementing resilient connectivity in a SAS domain comprising:
   a first edge expander and a second edge expander, each edge expander having a plurality of direct routing ports and a subtractive routing port;
   each of said plurality of direct routing ports of said first edge expander respectively connected to said first port of a respective one of a plurality of SAS devices for enabling communications between each of said plurality of SAS devices;
   each of said plurality of direct routing ports of the second edge expander respectively connected to a second port of a respective one of said plurality of SAS devices for enabling communications between each of said plurality of SAS devices; and
   said subtractive routing ports of said first edge expander and said second edge expander connected together for enabling communications between each of said plurality of SAS devices via said first ports and said second ports of said plurality of SAS devices.

12. A Serial Attached SCSI (SAS) network as recited in claim 11 wherein said subtractive routing ports of said first edge expander and said second edge expander include multiple point-to-point links enabling multiple concurrent connections.

* * * * *